United States Patent
Jordan et al.

(10) Patent No.: US 7,909,547 B2
(45) Date of Patent: Mar. 22, 2011

(54) REPLACEABLE TIP FOR A BIT OR AUGER BIT

(75) Inventors: Kenneth Jordan, Pewaukee, WI (US);
Scott Bublitz, Hartland, WI (US);
Jonathan Zick, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1193 days.

(21) Appl. No.: 11/539,379

(22) Filed: Oct. 6, 2006
(Under 37 CFR 1.47)

(65) Prior Publication Data
US 2008/0298916 A1    Dec. 4, 2008

Related U.S. Application Data

(60) Provisional application No. 60/724,400, filed on Oct. 8, 2005.

(51) Int. Cl.
*B23B 51/02*    (2006.01)
(52) U.S. Cl. ............... 408/214; 408/230; 408/713
(58) Field of Classification Search .......... 408/213, 408/214, 230, 713; *B23B 51/02*
See application file for complete search history.

(56) References Cited

U.S. PATENT DOCUMENTS

| | | | | |
|---|---|---|---|---|
| 12,551 A | * | 3/1855 | Hoagland | 408/200 |
| 14,752 A | * | 4/1856 | Curtiss | 408/214 |
| 20,192 A | * | 5/1858 | Clark | 408/194 |
| 22,195 A | * | 11/1858 | Norris | 408/194 |
| 22,394 A | * | 12/1858 | White et al. | 408/222 |
| 29,883 A | * | 9/1860 | Hathaway | 408/212 |
| 79,181 A | * | 6/1868 | Andrews | 408/195 |
| 82,956 A | * | 10/1868 | Ives | 408/195 |
| 95,379 A | * | 9/1869 | Richardson | 408/201 |
| 111,099 A | * | 1/1871 | Walch | 408/195 |
| RE5,238 E | * | 1/1873 | Walch | 408/195 |
| 158,090 A | * | 12/1874 | King | 408/214 |
| 166,378 A | | 8/1875 | Higgins | |
| 216,023 A | * | 6/1879 | Crane | 408/218 |
| 221,391 A | * | 11/1879 | Brinton | 408/195 |
| 329,660 A | * | 11/1885 | Lord | 408/213 |
| 444,956 A | * | 1/1891 | Jones | 408/200 |

(Continued)

FOREIGN PATENT DOCUMENTS

CA    2097971    12/1994

(Continued)

OTHER PUBLICATIONS

Milwaukee Electric Tool Corporation Selfeed Bit #48-25-1001, publicly disclosed prior to Oct. 8, 2005.

(Continued)

*Primary Examiner* — Eric A Gates
(74) *Attorney, Agent, or Firm* — Michael Best & Friedrich LLP

(57) ABSTRACT

Tool elements, such as, bits, auger bits, concrete bits, etc. are provided. The tool elements include a body and a cutting element removably connected to the body. The cutting element may be removably connected to the body in a variety of manners. The body and the cutting element may be made from a similar material or from different materials. The tool element may also include a second cutting element removably connected to the body or to the first cutting element. In some aspects, the second cutting element is a feed screw. In other aspects, the second cutting element is a continuation of the first cutting element.

21 Claims, 17 Drawing Sheets

U.S. PATENT DOCUMENTS

| | | | |
|---|---|---|---|
| 450,908 A | 4/1891 | Brede et al. | |
| 458,640 A * | 9/1891 | Phillips | 408/214 |
| 529,832 A * | 11/1894 | Phillips | 408/232 |
| 548,385 A * | 10/1895 | Nelson | 408/202 |
| 567,271 A | 9/1896 | Howard et al. | |
| 646,439 A * | 4/1900 | Lavigne | 408/195 |
| 778,845 A | 1/1905 | Cox | |
| 808,245 A | 12/1905 | Lund | |
| 877,831 A | 1/1908 | Creedon | |
| 1,066,707 A | 7/1913 | Caldwell | |
| 1,389,578 A | 9/1921 | Charlton | |
| 1,515,548 A | 11/1924 | Cerotsky | |
| 2,577,987 A | 12/1951 | Wilson | |
| 2,593,823 A * | 4/1952 | Wilson | 408/213 |
| 2,618,304 A * | 11/1952 | Wilson | 408/194 |
| 2,883,888 A * | 4/1959 | Stewart | 76/102 |
| 3,165,131 A | 1/1965 | Mackey | |
| 3,175,630 A | 3/1965 | Hein et al. | |
| 3,267,975 A | 8/1966 | Enders | |
| 3,554,192 A | 1/1971 | Isberner | |
| 3,655,244 A | 4/1972 | Swisher | |
| 3,687,565 A * | 8/1972 | Byers et al. | 408/201 |
| 3,945,753 A * | 3/1976 | Byers et al. | 408/201 |
| RE28,900 E | 7/1976 | Byers et al. | |
| 4,050,840 A | 9/1977 | Skingle | |
| 4,050,841 A | 9/1977 | Hildebrandt | |
| 4,090,807 A | 5/1978 | Stewart | |
| 4,095,491 A | 6/1978 | Hildebrandt | |
| 4,239,427 A | 12/1980 | Walton, II | |
| 4,244,667 A | 1/1981 | Timmons | |
| 4,536,107 A | 8/1985 | Sandy et al. | |
| 4,625,593 A | 12/1986 | Schmotzer | |
| 4,768,901 A | 9/1988 | Reinauer et al. | |
| 4,773,354 A | 9/1988 | Wilbur | |
| 5,092,719 A | 3/1992 | Zsiger | |
| 5,098,234 A | 3/1992 | Judkins et al. | |
| 5,193,951 A | 3/1993 | Schimke | |
| 5,244,319 A | 9/1993 | Cochran | |
| 5,302,060 A | 4/1994 | Nystrom et al. | |
| 5,376,092 A | 12/1994 | Hein et al. | |
| 5,423,640 A | 6/1995 | Lindblom et al. | |
| 5,607,263 A | 3/1997 | Nespeta et al. | |
| 5,649,794 A | 7/1997 | Kress et al. | |
| 5,695,304 A | 12/1997 | Ebert | |
| 5,733,076 A | 3/1998 | Basteck | |
| 5,810,517 A | 9/1998 | Bostic | |
| 5,820,319 A * | 10/1998 | Hull et al. | 408/214 |
| 5,865,571 A | 2/1999 | Tankala et al. | |
| 5,895,179 A | 4/1999 | Gschwend et al. | |
| 5,971,674 A | 10/1999 | Holley | |
| 5,975,814 A | 11/1999 | Pomp | |
| 6,024,520 A | 2/2000 | Haughton et al. | |
| 6,045,302 A | 4/2000 | Orr | |
| 6,073,710 A | 6/2000 | Popp et al. | |
| 6,089,337 A | 7/2000 | Kleine et al. | |
| 6,109,841 A | 8/2000 | Johne | |
| 6,158,304 A | 12/2000 | Packer et al. | |
| 6,213,232 B1 | 4/2001 | Peetz | |
| 6,354,773 B1 * | 3/2002 | Konen | 408/213 |
| 6,354,774 B1 | 3/2002 | Haughton et al. | |
| 6,361,255 B1 | 3/2002 | Schmotzer | |
| 6,394,714 B2 | 5/2002 | Eberhard | |
| 6,499,919 B2 | 12/2002 | Feld | |
| 6,612,788 B2 | 9/2003 | Thomas et al. | |
| 6,652,202 B2 | 11/2003 | Remke et al. | |
| 6,874,978 B2 * | 4/2005 | Gongola | 408/144 |
| 7,246,975 B2 * | 7/2007 | Corso et al. | 408/206 |
| 7,416,371 B2 * | 8/2008 | Scott et al. | 408/1 R |
| 7,544,026 B2 * | 6/2009 | Durfee | 408/214 |
| 7,625,160 B2 * | 12/2009 | Zeiler et al. | 408/213 |
| 7,661,911 B2 * | 2/2010 | Zeiler et al. | 408/1 R |
| 2002/0141838 A1 * | 10/2002 | Thomas et al. | 408/214 |
| 2002/0182021 A1 | 12/2002 | Hsieh | |
| 2003/0180108 A1 * | 9/2003 | Gongola | 408/199 |
| 2005/0135887 A1 | 6/2005 | Borschert et al. | |
| 2005/0249562 A1 | 11/2005 | Frejd | |
| 2005/0249563 A1 | 11/2005 | Scott et al. | |
| 2007/0253788 A1 | 11/2007 | Miebach | |
| 2010/0054880 A1 * | 3/2010 | Ray | 408/1 BD |
| 2010/0124467 A1 * | 5/2010 | Nordlin et al. | 408/213 |

FOREIGN PATENT DOCUMENTS

| | | |
|---|---|---|
| CA | 2313749 | 9/2001 |
| EP | 0870561 | 1/2001 |
| FR | 2271000 | 12/1975 |
| GB | 674018 | 6/1952 |
| GB | 791571 | 3/1958 |
| GB | 2 225 262 | 5/1990 |
| JP | 8-238617 | 9/1996 |
| WO | WO 85/02442 | 6/1985 |
| WO | WO 89/00097 | 1/1989 |

OTHER PUBLICATIONS

Milwaukee Electric Tool Corporation Selfeed Bit #'s 48-25-3001, 3621, and 4621, publicly disclosed prior to Oct. 8, 2005.

* cited by examiner

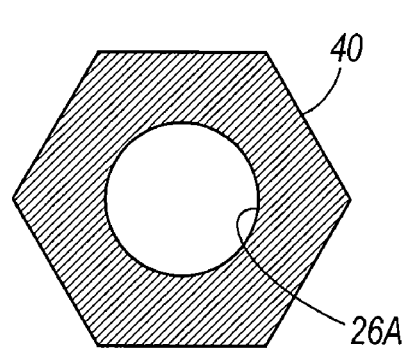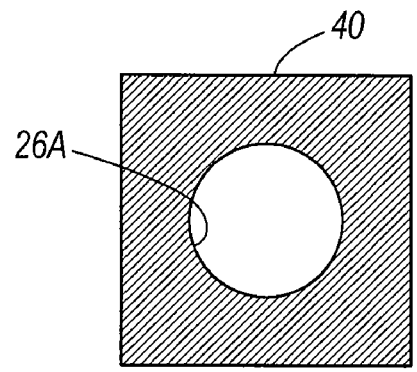
*FIG. 9*  *FIG. 10*
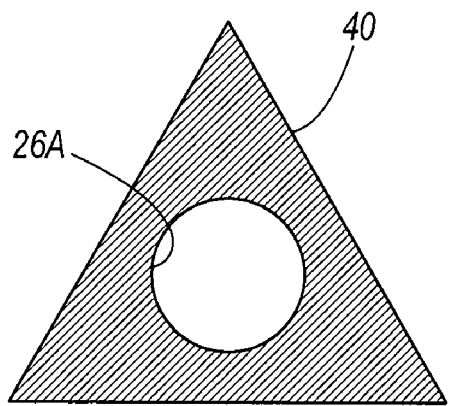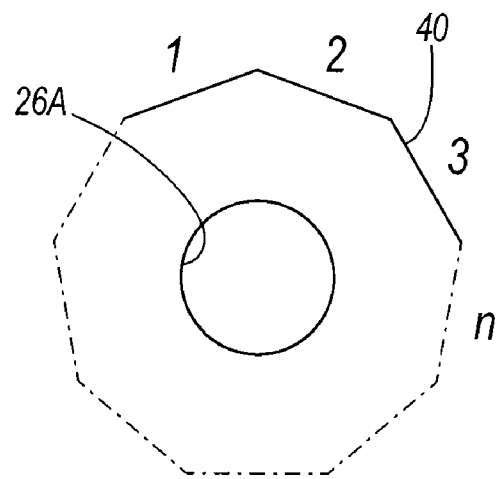
*FIG. 11*  *FIG. 12*

REPLACEABLE TIP FOR A BIT OR AUGER BIT

RELATED APPLICATIONS

The present application claims the benefit of U.S. Provisional Patent Application No. 60/724,400, filed Oct. 8, 2005, the entire contents of which are hereby incorporated by reference.

FIELD OF THE INVENTION

The present invention generally relates to tool elements and, more particularly, to bits, auger bits, concrete bits, etc.

BACKGROUND

With a bit, such as, for example, an auger bit, the tip portion cuts the work piece, and the remainder of the bit generally removes material cut from the work piece. The cutting tip portion may wear, requiring some action by the user (e.g., sharpening of the cutting portion(s), replacement of the entire bit, etc.).

A user will typically select a tool element, such as, for example, a bit, an auger bit, a concrete bit, etc., based on one or more of price (in many cases), durability (e.g., against nail impacts), ability to re-sharpen numerous times (e.g., quick on-site repair or via sharpening service, etc.), etc. On a job site, many users have a container(s) filled with dulled or damaged bits, auger bits, etc., which may be held until a cost effective re-sharpening service is found. Many of these bits may be damaged beyond repair (bent shafts, broken feed screws, damaged cutting edge, etc.). However, users do not typically view these products as disposable. For example, due to the expense of an auger bit, a user will make a significant effort to repair the bit.

SUMMARY

In some independent aspects and in some constructions, a tool element, such as, for example, a bit, an auger bit, a concrete bit, etc., may generally include a body and a cutting portion removably and/or replaceably connected to the body.

In some independent aspects and in some constructions, a tool element for cutting a workpiece is provided and includes a body including a shank for connecting the tool element to a power tool and a cutting element removably connectable to the body.

In some independent aspects and in some constructions, a tool element, such as, for example, a bit, an auger bit, a concrete bit, etc., may generally include a body and a cutting tip portion connected to the body, the body being formed of a first material and/or first process, the cutting tip portion being formed of a second material and/or second process different than the first material and/or first process.

In some independent aspects and in some constructions, a tool element for cutting a workpiece is provided and includes a body including a shank for connecting the tool element to a power tool, the body being made of a first material, and a cutting element removably connectable to the body, the cutting element being made of a second material different than the first material.

In some independent aspects and in some constructions, a tool element assembly, such as, for example, a bit, an auger bit, a concrete bit, etc., may generally include a body, a first cutting portion removably connectable to the body, and a second cutting portion removably connectable to the body, the first cutting portion and the second cutting portion being different.

In some independent aspects and in some constructions, a tool element for cutting a workpiece is provided and includes a body including a shank for connecting the tool element to a power tool, a first cutting element removably connected to the body, and a second cutting element separate from the first cutting element and being removably connected to the body.

Independent features and independent advantages of the present invention will become apparent to those skilled in the art upon review of the detailed description and drawings.

BRIEF DESCRIPTION OF THE DRAWINGS

FIG. 9 is a cross-sectional view of a portion of the tool element shown in FIGS. 5-8, taken along line 9-9.

FIGS. 10-12 are alternative constructions of the cross-sectional view of a portion of the tool element shown in FIGS. 5-8.

Figure 1:
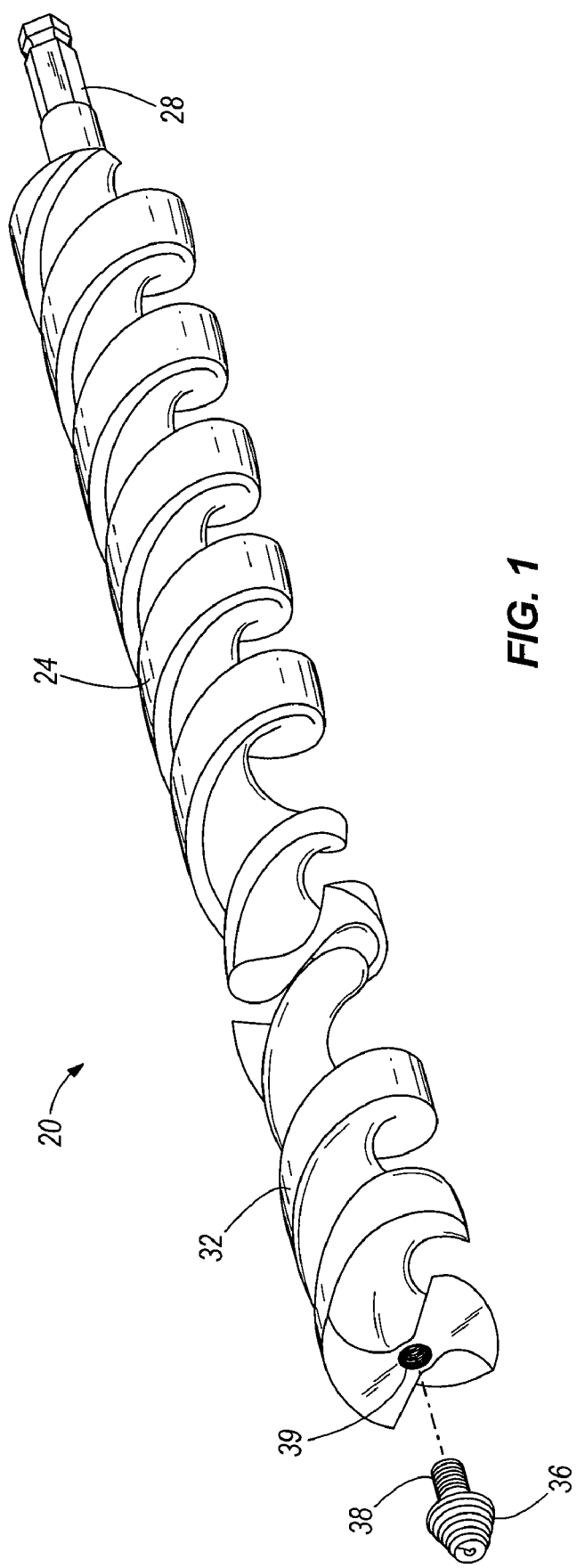
FIGS. 1-4 are perspective views of a tool element, such as, for example, an auger bit.
Figure 2:
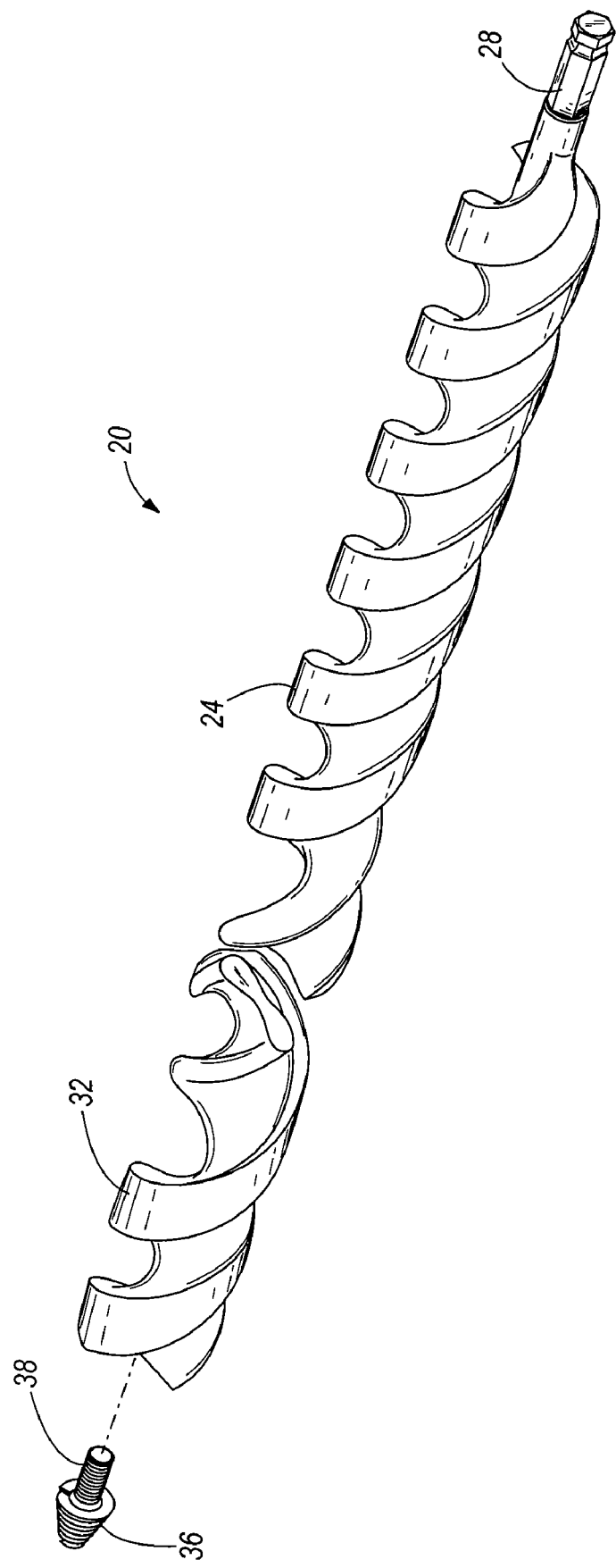
Figure 3:
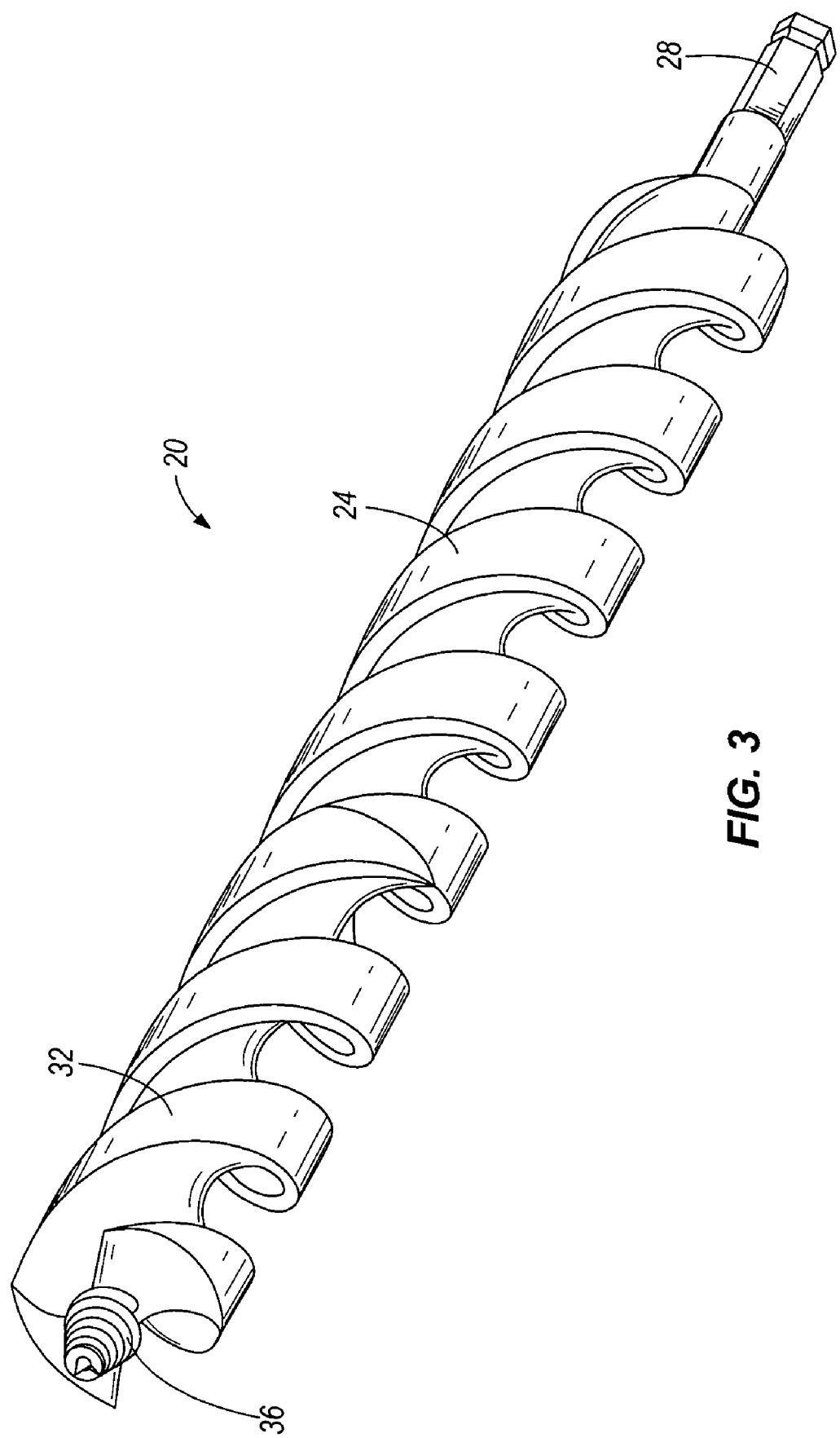
Figure 4:
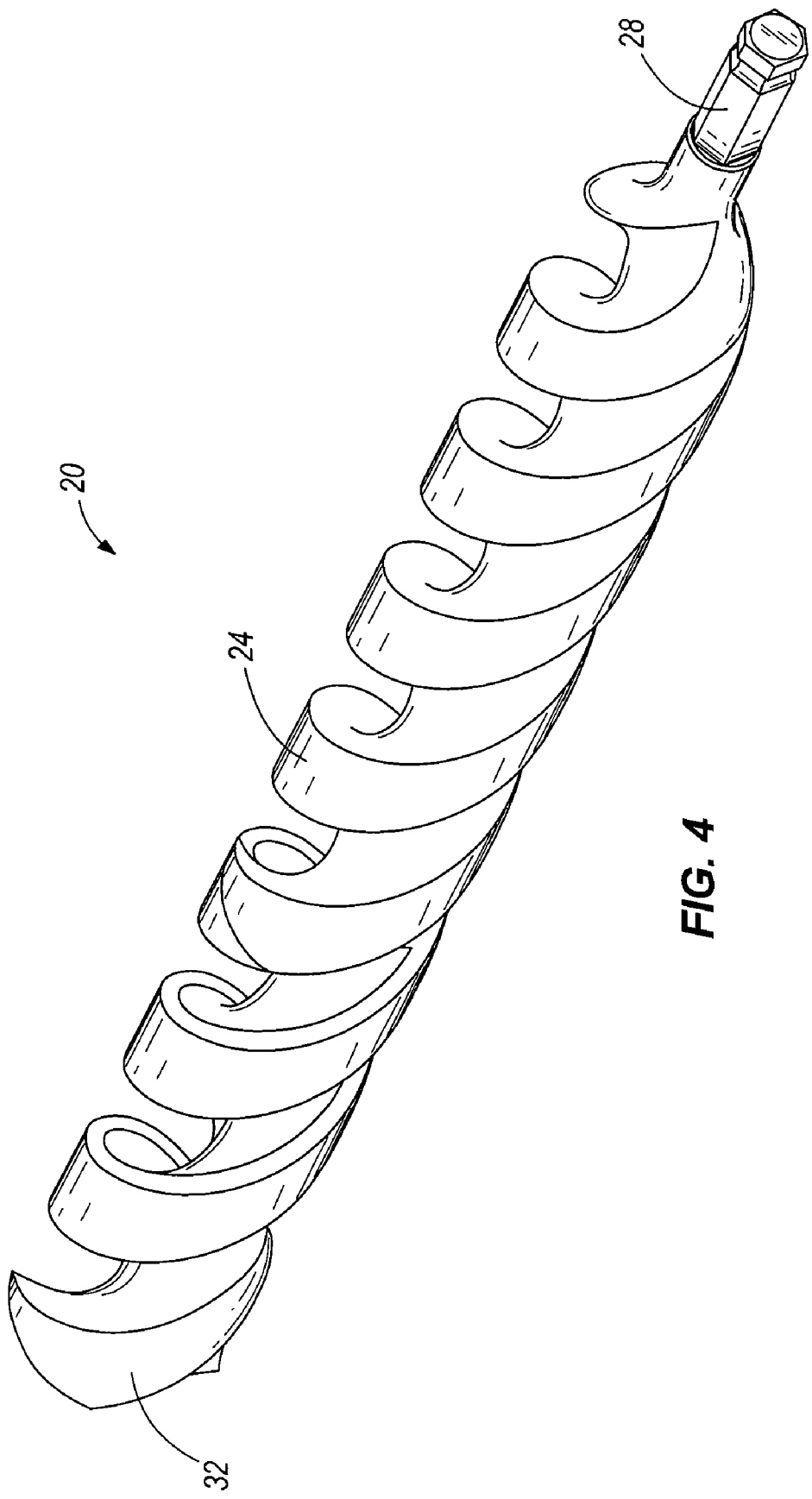
Figure 5:
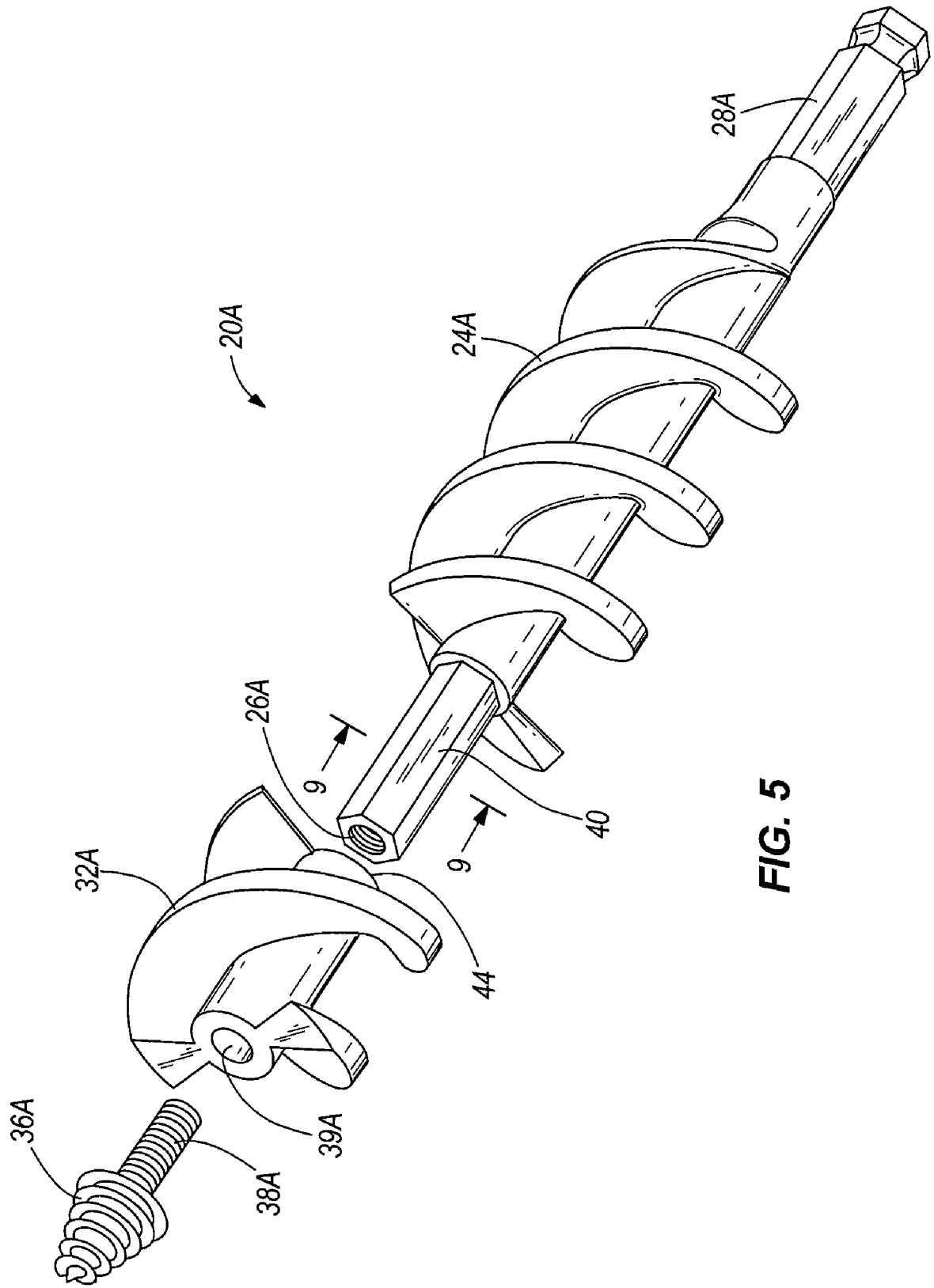
FIGS. 5-8 are perspective views of another construction of a tool element, such as, for example, an auger bit.
Figure 6:
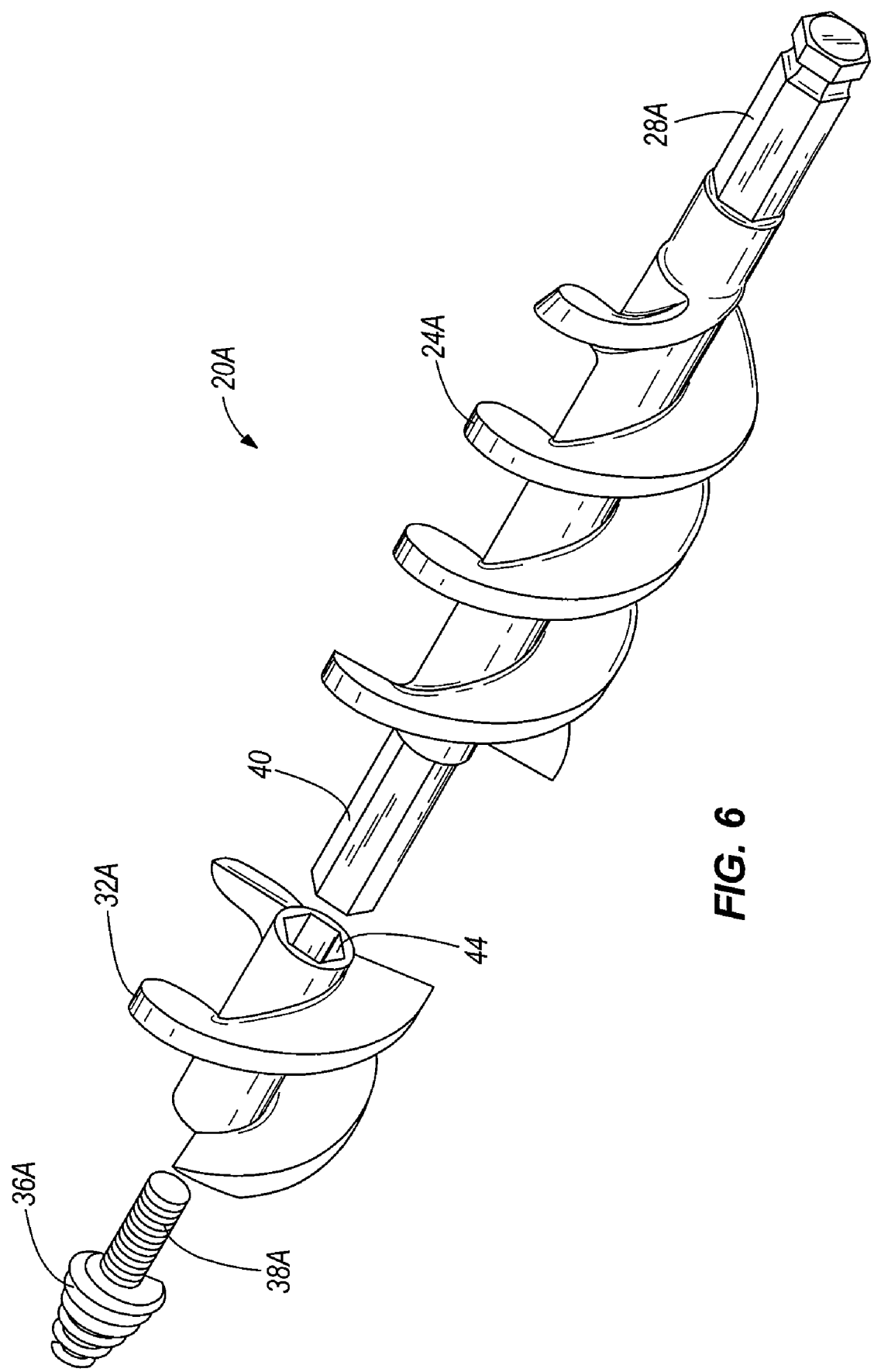
Figure 7:
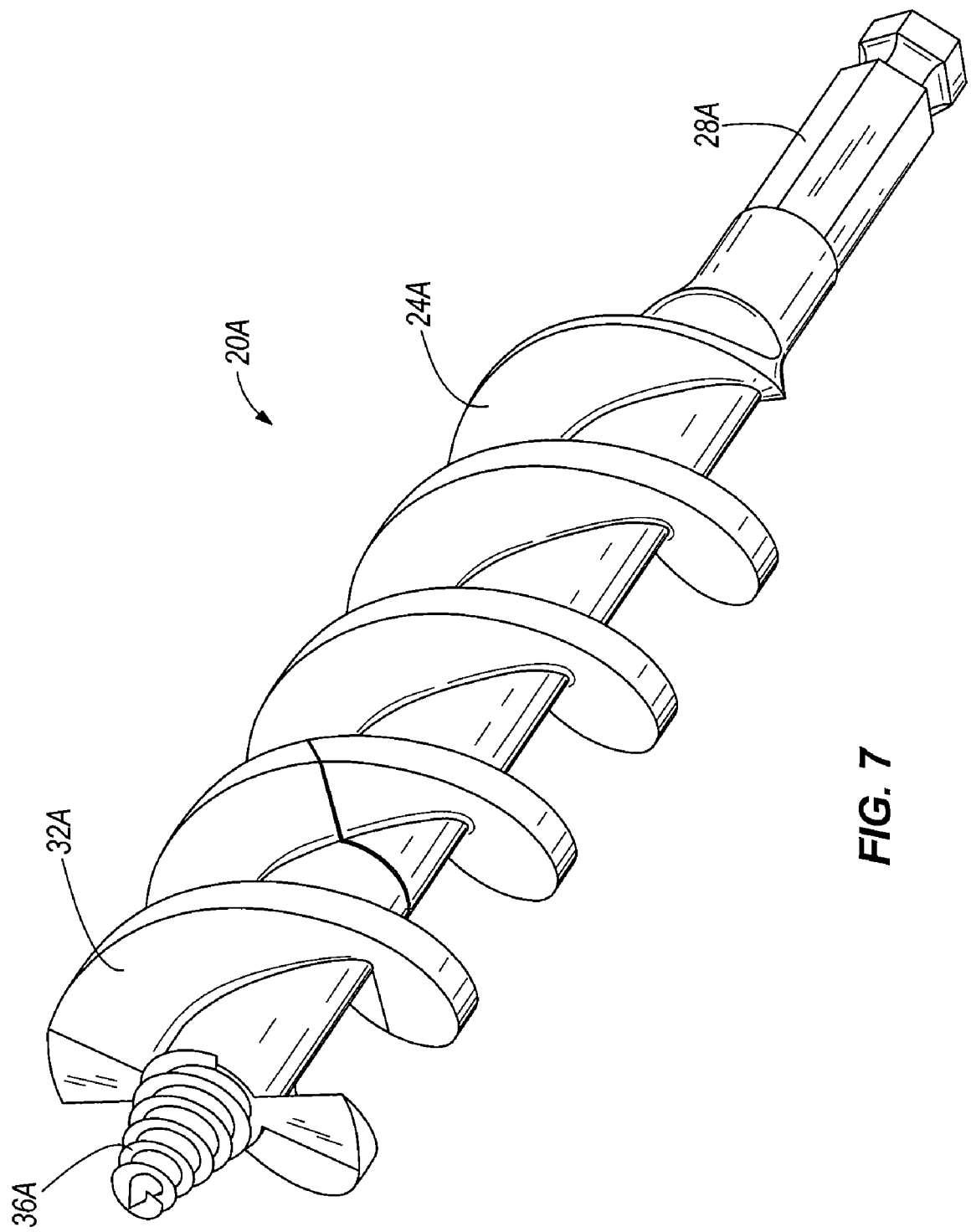
Figure 8:
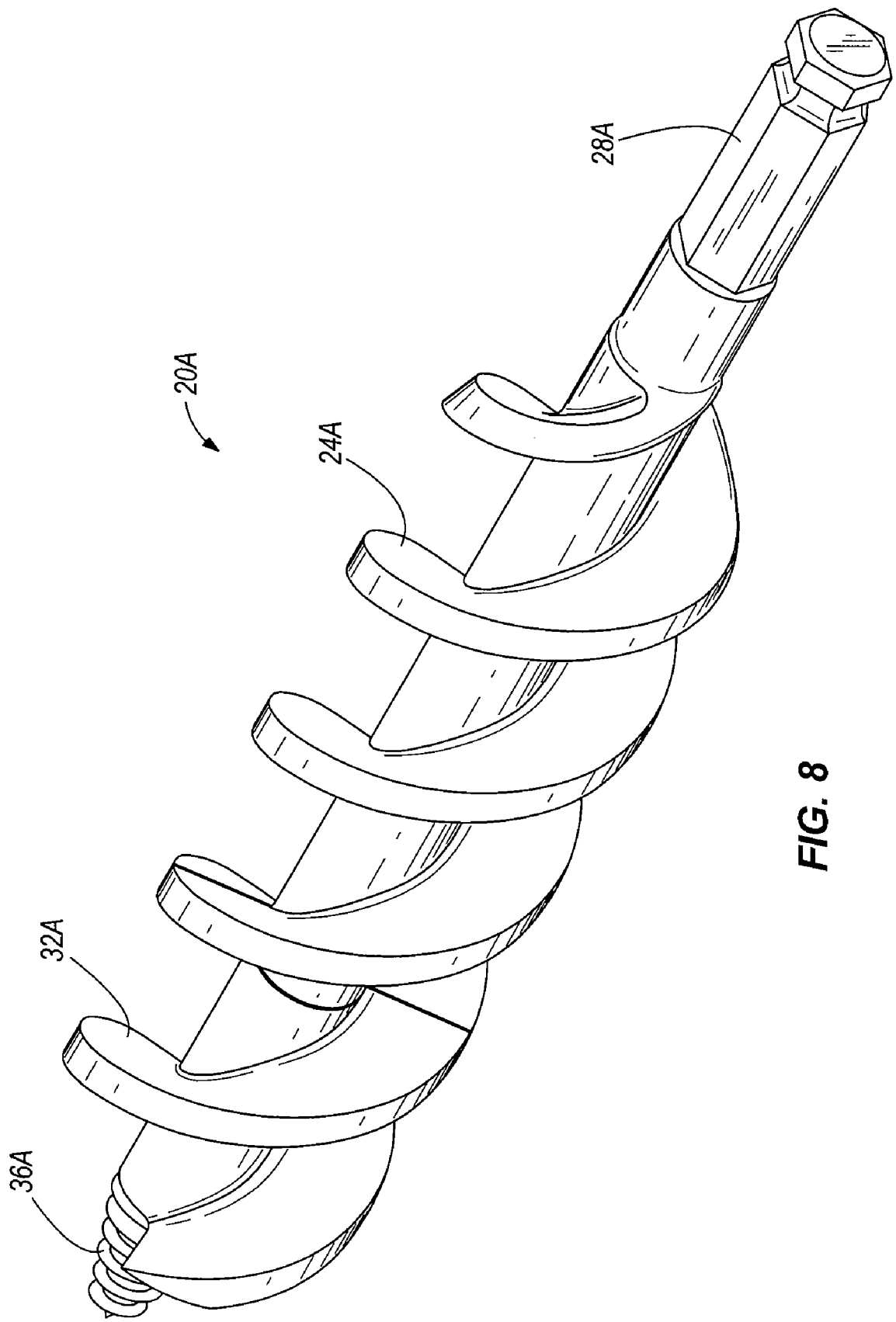

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

Although references are made below to directions, such as left, right, up, down, top, bottom, front, rear, forward, back, etc., in describing the drawings, the references are made relative to the drawings (as normally viewed) for convenience. These directions are not intended to be taken literally or to limit the present invention in any form.

The use of "including", "having", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DECRIPTION

Constructions of a tool element 20, such as, for example, a bit, an auger bit, a Selfeed bit, a boring bit, a Bellhanger bit, an electrician's bit, a cable bit, a Forstner bit, a concrete bit, a hammer bit, a core bit, a large hole system bit, etc., are illustrated in the figures. Independent aspects of the illustrated bits may be incorporated in other tool elements, such as, for example, hole saws, hole saw arbors, pilot drills, saw blades, grinding wheels, chisels, etc.

With reference to FIGS. 1-4, the bit 20 generally includes a body 24, a shank 28 for connecting the bit 20 to a power tool, and a cutting element or portion 32 removably and/or replaceably connected to the body 24. In the illustrated construction, the cutting portion 32 and the body 24 twist together to connect to one another. In this manner, the body 24 and the cutting portion 32 have complementary surfaces that allow the body 24 and the cutting portion 32 to be twisted and secured together. The connection between the body 24 and the cutting portion 32 is sufficient to withstand normal operating conditions of the bit 20, but facilitates removability of the cutting portion 32 from the body 24 when a user desires such removal. In some independent aspects and in illustrated constructions, the body 24 may be formed of a first material and/or first process and the cutting portion 32 may be formed of a second material and/or second process different than the first material and/or first process. In some independent aspects and in illustrated constructions, the bit 20 also includes a second cutting portion or feed screw 36 removably connectable to the body 24 and the first cutting portion 32. In the illustrated construction, the feed screw 36 is threaded into an opening 39 defined in the cutting portion 32. In some constructions, the feed screw 36 can assist in removably and/or replaceably connecting the first cutting portion 32 to the body 24 by passing completely through the cutting portion 32 and threading to the body 24 to compress the cutting portion 32 between the feed screw 36 and the body 24, thereby securing the cutting portion 32 to the body 24. The feed screw 36 and the first cutting portion 32 are formed separately from one another and may be formed of the same material or may be formed of a different material.

Because the first and second cutting portions 32, 36 cut the work piece, they may wear over time. Accordingly, one or both of the first and second cutting portions 32, 36 may be removed from the body 24 and replaced with a new or sharpened first and/or second cutting portions 32, 36. After replacement of the first and/or second cutting portions 32, 36, a user may continue using the bit 20 after only a relatively short interruption.

In some independent aspects and in some constructions, either or both the first and second cutting portions 32, 36 may be formed of a relatively harder material (but more expensive material) to resist wear, and the remainder of the bit 20 may be formed from less hard material (and less expensive material) to reduce the overall cost of the bit 20.

Also, in some constructions, the body 24 of the bit 20 may be cable of receiving different types of cutting portions constructed to cut different types of materials or combination of materials (wood, wood with embedded nails, concrete, etc.). The different cutting portions may be substitutably connectable to the body 24 of the bit 20 to provide optimized cutting of a selected work piece of a specific material, combination of materials, etc.

With reference to FIGS. 5-8, an alternative construction of a bit 20A is illustrated. Like elements are identified with like reference numbers "A". The bit 20A is similar to the multiple part bit system shown in FIGS. 1-4, but the body 24A and the cutting portion 32A of the bit 20A slide together to form a complete bit. The bit 20A includes the body 24A, the first cutting portion 32A, and the second cutting portion 36A. The parts of the bit 20A include complementary structure to limit, impede, inhibit, resist and/or prevent relative rotation of the parts.

With further reference to FIGS. 5-8 and additional reference to FIG. 9, a hex-shaped projection 40 is formed on the body 24A and a complementary hex-shaped recess 44 is formed in the cutting portion 32A. Alternatively, the hex-shaped projection may be formed on the cutting portion 32A and the hex-shaped recess may be formed in the body 24A. Inter-engagement of the hex-shaped structures 40, 44 limits, impedes, resists, inhibits and/or prevents relative rotation of the parts.

With reference to FIGS. 10-12, other complementary structures, such as, for example, square, triangle, non-circular, eccentric, partially flat, etc., may be provided to limit, impede, resist, inhibit and/or prevent relative rotation of the parts. In other constructions, other complementary structure formed on other portions of the bit (e.g., the bit threads, etc.) may be provided to limit, impede, resist, inhibit and/or prevent relative rotation of the parts.

Referring back to FIGS. 5-8, the body 24A and cutting portion 32A are screwed together with the removable and/or replaceable feed screw 36A. The feed screw 36A includes a threaded rear portion 38A which is inserted through the opening 39A in the cutting portion 32A and threadedly engageable in a threaded recess 26A in the body 24.

Figure 13:
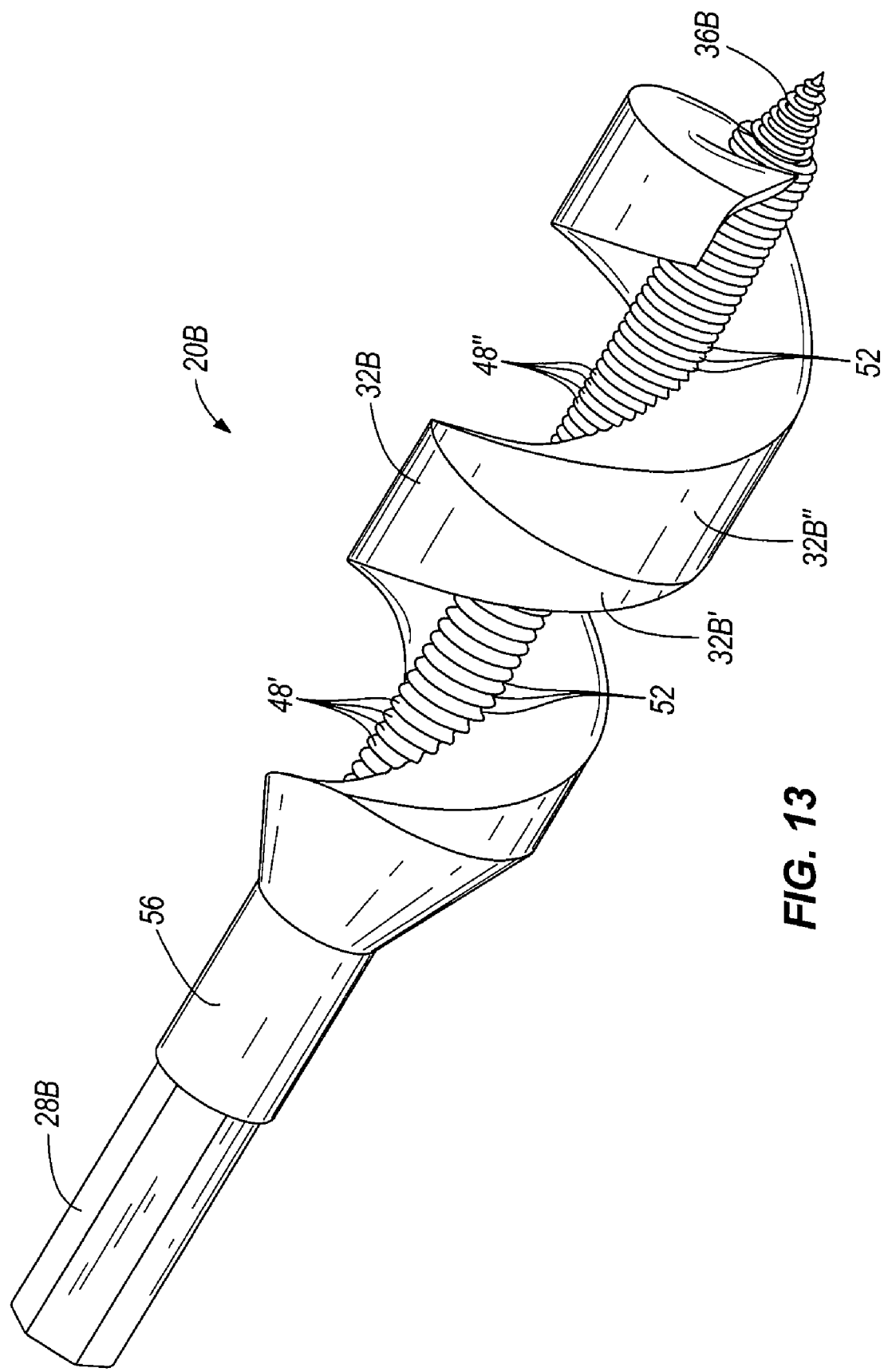
FIG. 13 is a perspective view of yet another construction of a tool element, such as, for example, an auger bit.
Figure 14:
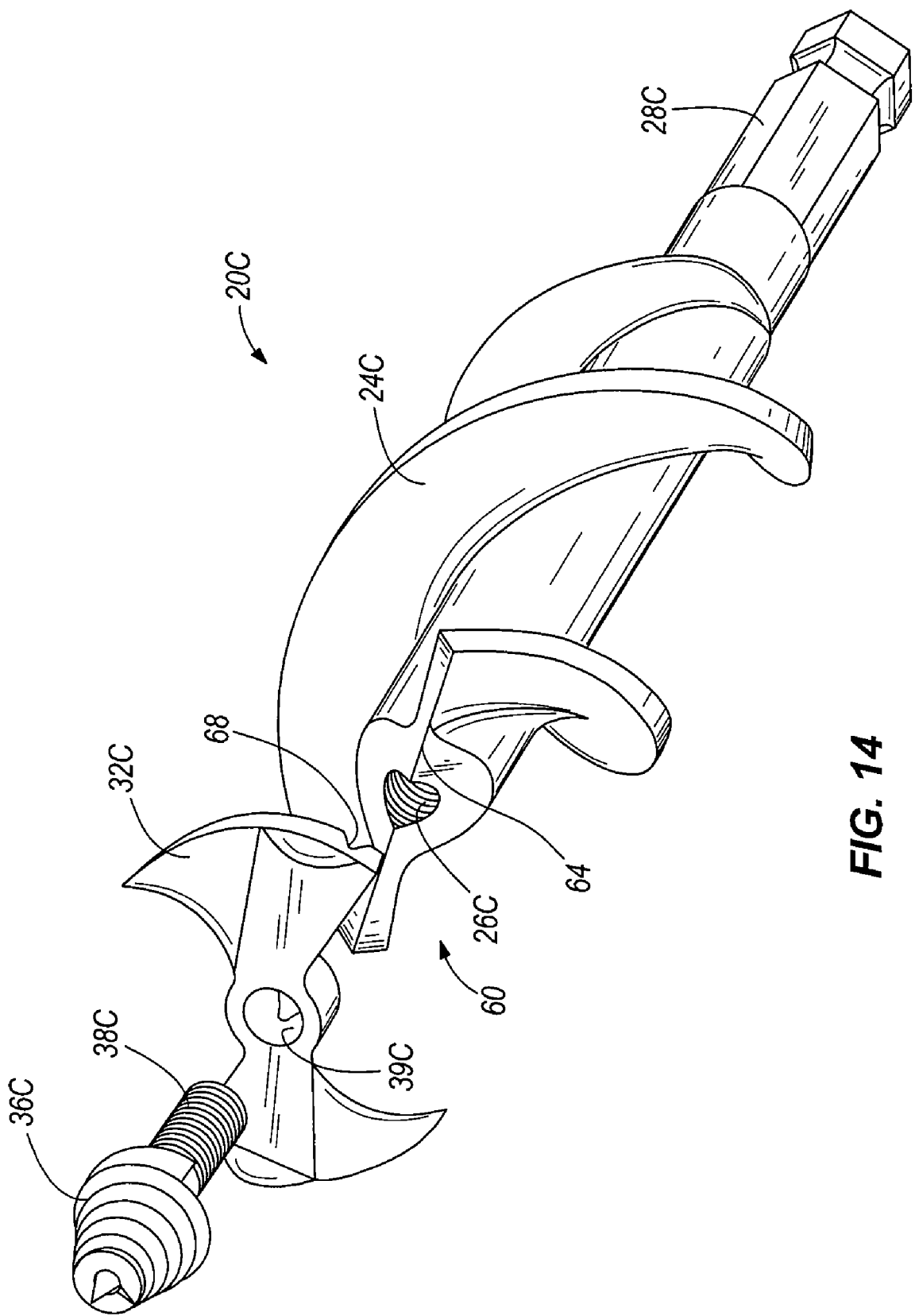
FIGS. 14-17 are perspective views of a further construction of a tool element, such as, for example, an auger bit.
Figure 15:
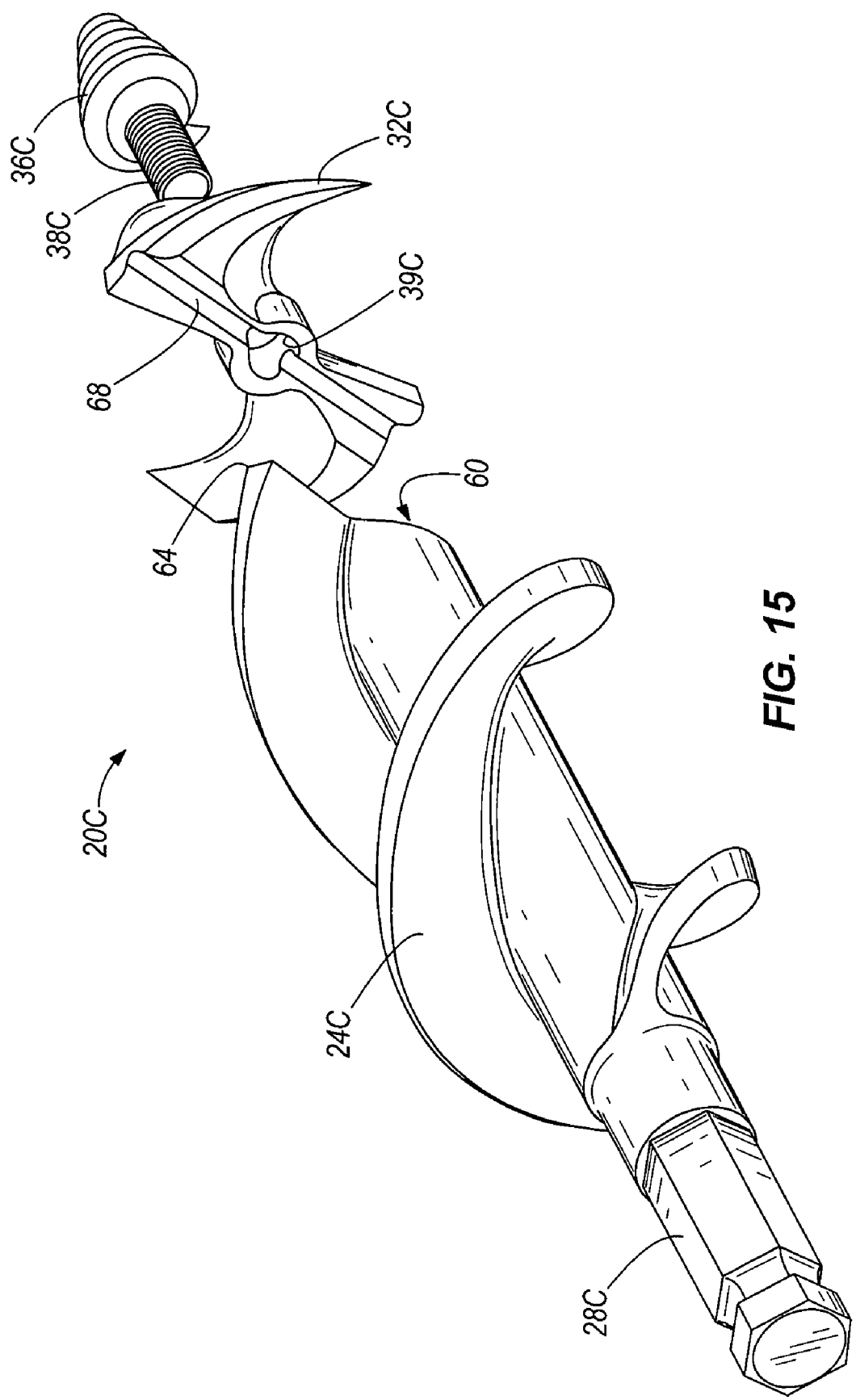
Figure 16:
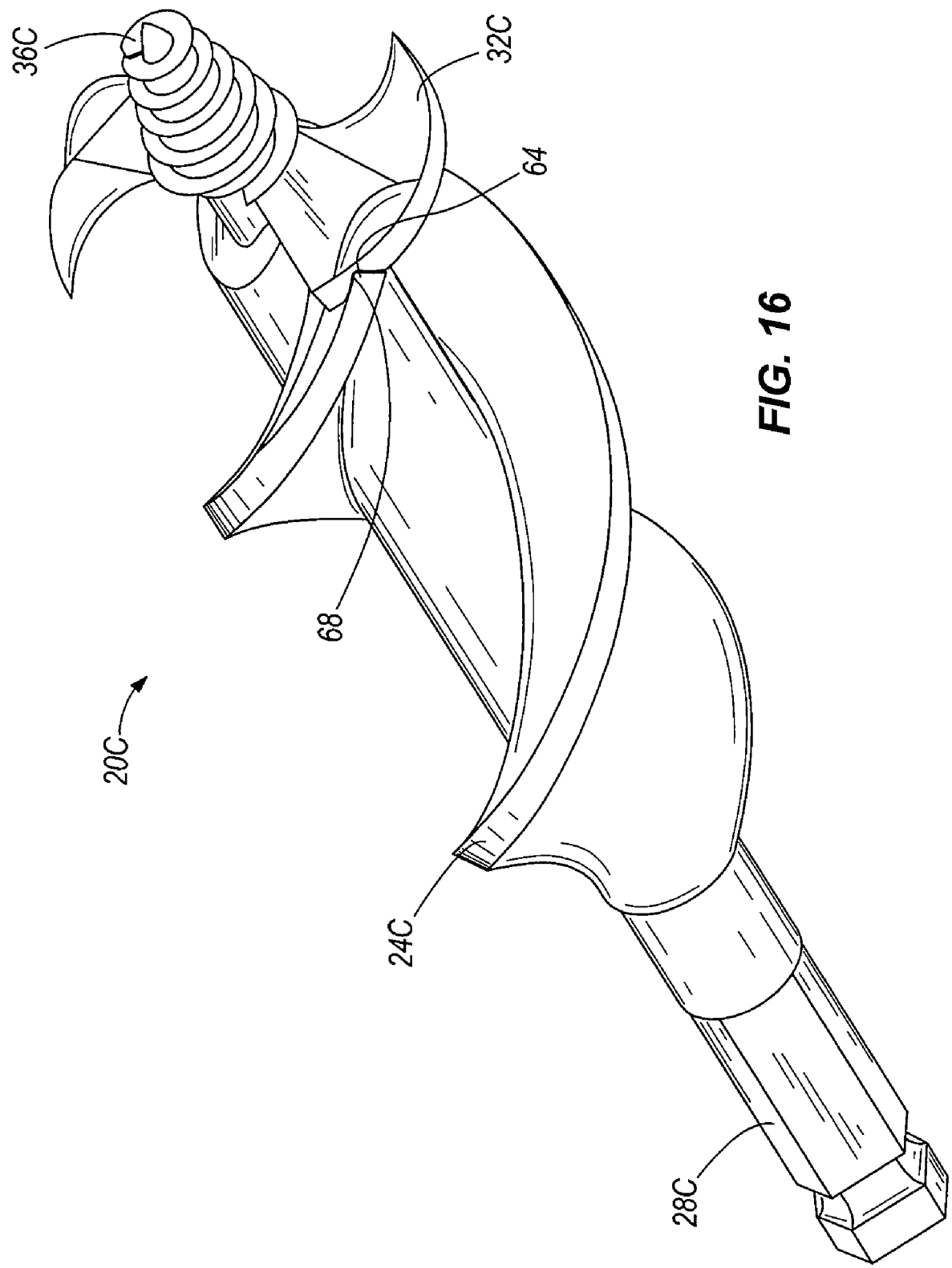
Figure 17:
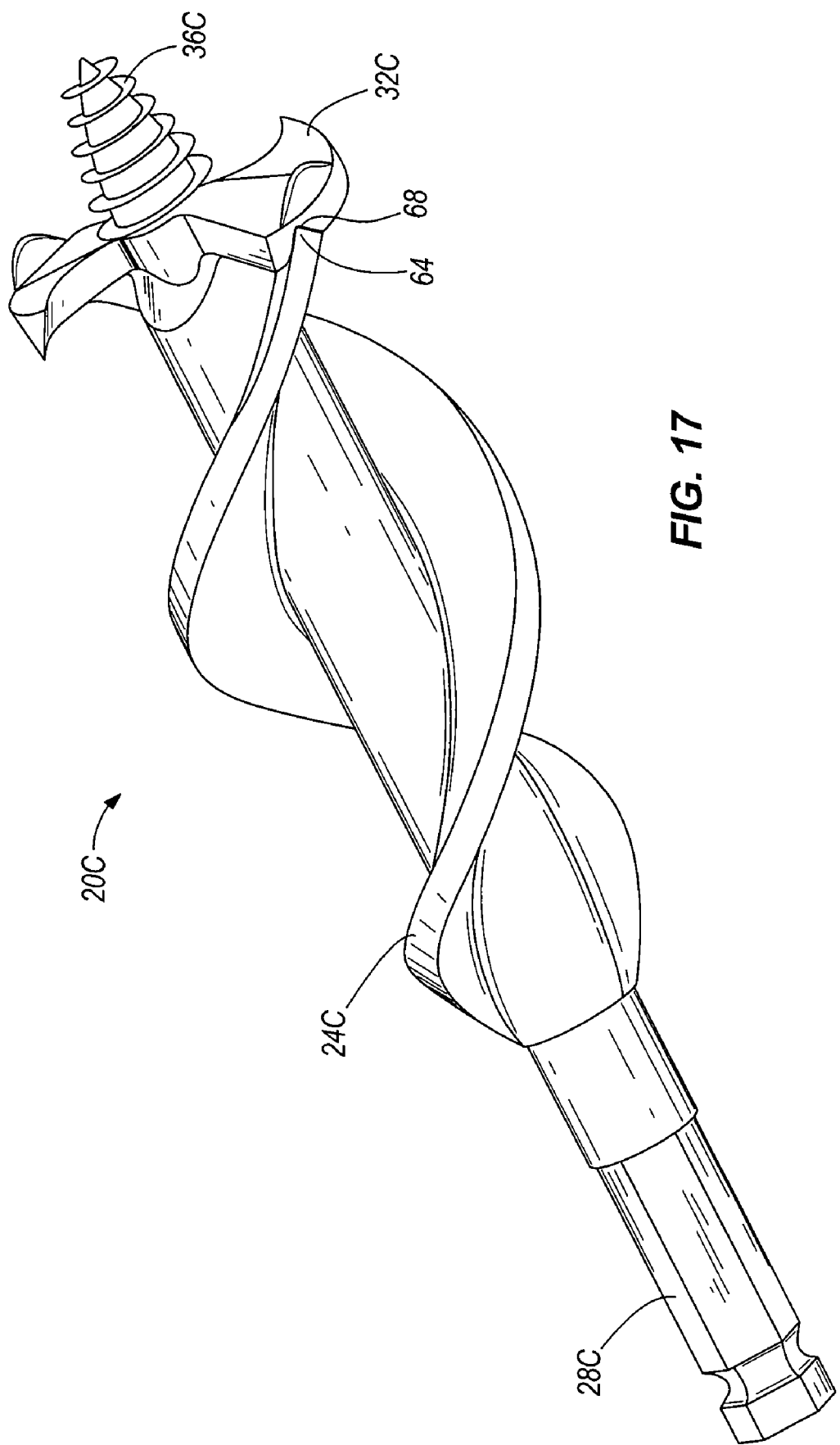

FIG. 13 illustrates another construction of a multiple part bit system. Like elements are identified with like reference numbers "B". In this construction, the body 24B has external threads 48 defined in an outer surface thereof and the cutting portion 32B has internal threads 52 defined therein complimentary to the external threads 48 on the body 24B. The cutting portion 32B threads onto and off of the body 24B to facilitate removal and replacement of the cutting portion 32B. The body 24B may include a stop 56 engageable by the cutting portion 32B when the cutting portion 32B is completely threaded onto the body 24B. The stop 56 inhibits the cutting portion 32B from rotating relative to the body 24B during operation of the bit 20B. In some constructions, the cutting portion 32B includes two parts 32B', 32B" and the body 24B has two sets of external threads, course threads 48' and fine threads 48". In such constructions, the first cutting portion 32B' is threaded onto the body 24B first and the second cutting portion 32B" is threaded onto the body 24B second until it mates with the first cutting portion 32B'. The second cutting portion 32B" is threaded onto the fine threads 48", which facilitates finer adjustment of the second cutting portion 32B" relative to the first cutting portion 32B' to ensure proper mating of the two cutting portions 32B', 32B".

With reference to FIGS. 14-17, another alternative construction of a multiple part bit system is illustrated. Like elements are identified with like reference numbers "C". In this construction, the cutting portion 32C is relatively small. Such a cutting portion 32C may be made of a relatively higher grade material. The end 60 of the body 24C adjacent the cutting portion 32C has a sharp edge or projection 64 and the cutting portion 32C includes a recess 68 defined in a surface thereof. To connect the cutting portion 32C to the body 24C, the edge or projection 64 is positioned in the recess 68, the feed screw 36C is inserted through the opening 39C in the cutting portion 32C, threaded into the threaded recess 26C in the body 24C, and tightened to compress the cutting portion 32C between the body 24C and the feed screw 36C. The engagement between the edge or projection 64 and the recess limits, impedes, resists, inhibits and/or prevents relative rotation of the body 24C and the cutting portion 32C.

Figure 18:
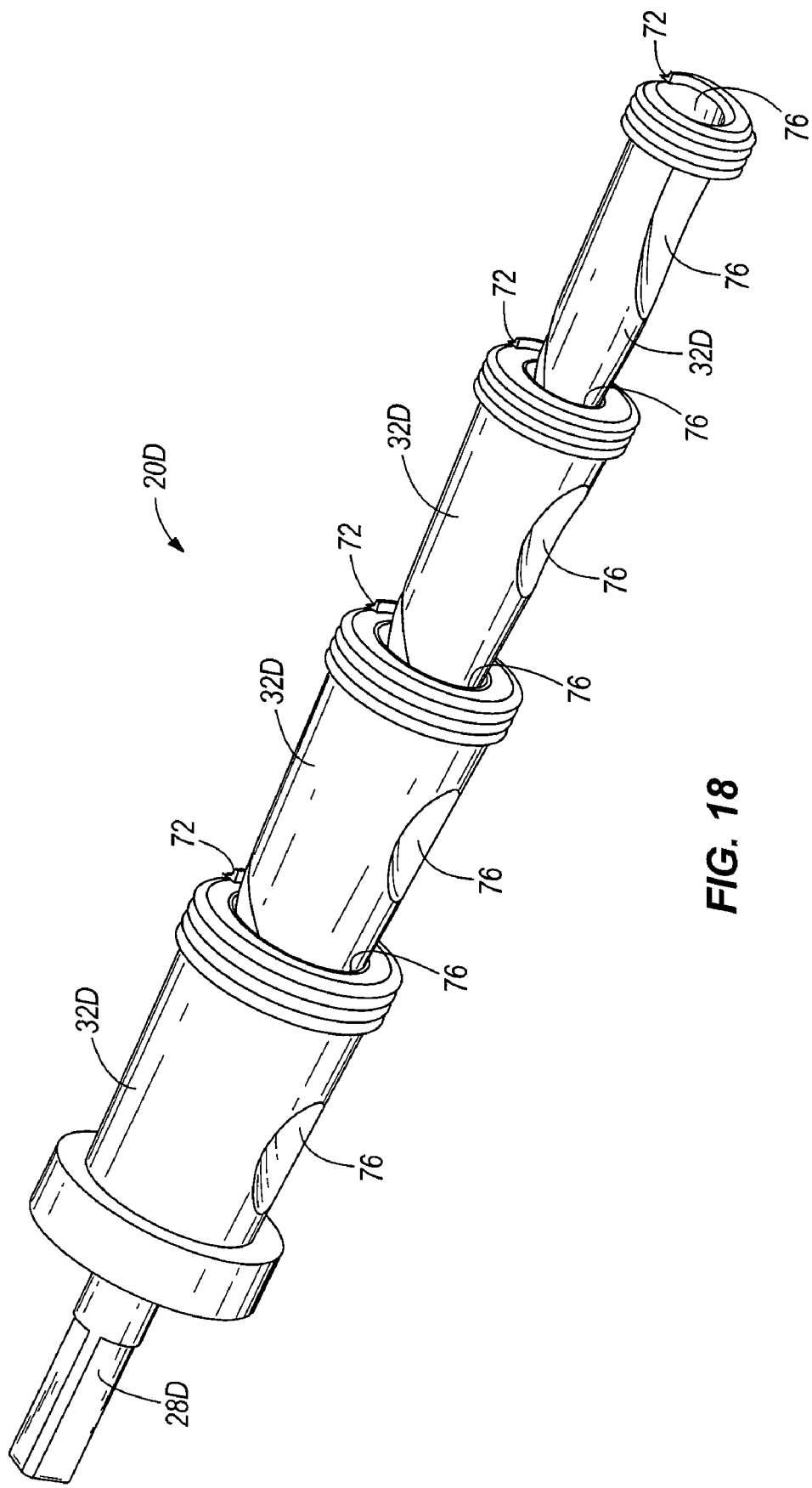
FIGS. 18-20 are perspective views of another construction of a tool element, such as, for example, an auger bit.
Figure 19:
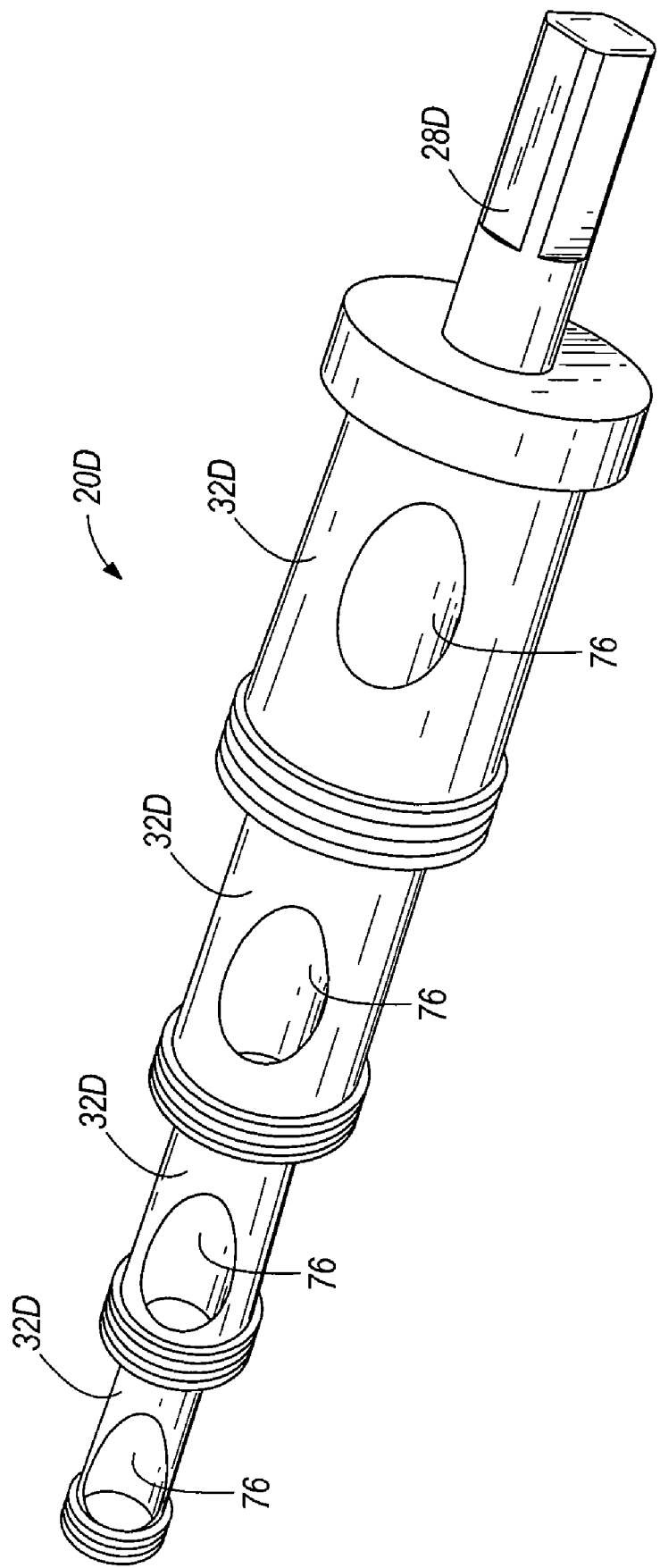
Figure 20:
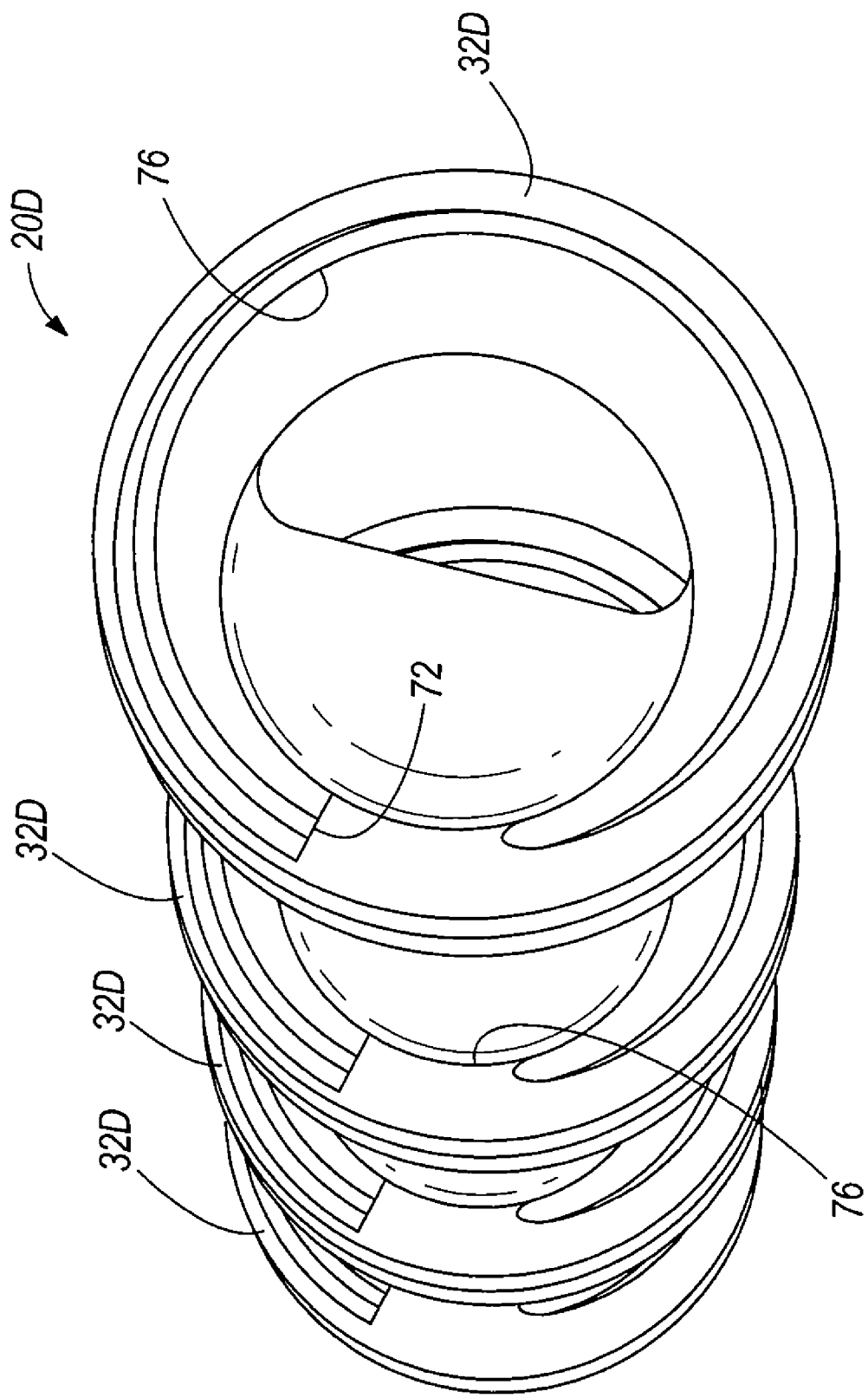

In some constructions, a bit may include a replaceable cutting edge and/or feed screw. Such a construction is not limited to just the physical cutting edge or screw but may include a replaceable end. With reference to FIGS. 18-20, another alternative construction of a multiple part bit system is illustrated. Like elements are identified with like reference numbers "D". One option may be a step like bit cutting portions 32D. In such a construction, the cutting portions 32D may be defined as the first 1" to 3" of the actual cutting end of the bit 20D, and this end could be interchangeable with 4", 6"

and 18" long cutting portions. The bit 20D includes a spur 72 that provides a very clean, smooth edged hole. Spurs 72 are sometimes susceptible to damage. In some constructions, the bit 20D may be useable with a removable and/or replaceable spur. Such a spur may eliminate the need to manufacture, sell and/or purchase both styles (an auger bit with a spur and an auger bit without a spur) and may be sold separately to those users needing a clean hole. The bit 20D may also include a carbide tip replaceable cutting edge and/or feed screw. Each of the cutting portions 32D include and opening 76 initiating at an end thereof and extending through a side of the cutting portions 32D. The opening 76 allows cut debris to be transferred from the cutting position, out the side of the cutting portions 32D, and away from the cutting position. The cutting portions 32D can be connected to each other in a variety of manners including threading, snap-fit, tongue and groove, ball-detent, etc.

It should be understood that each bit construction disclosed herein is capable of having features shown and described in other bit constructions. Also, the bit constructions are capable of having other features. For example, in some constructions, the bit may have a flute design which, rather than having a flat surface, may provide a "twist bit like" flute. Such a bit may provide a smaller surface area in contact with work piece (e.g., wood), resulting in less drag on the work piece. Also for example, in some constructions, the bit may have an improved cutting edge and may have improved re-sharpenability of the cutting edge. The tip portion may be removable for re-sharpening and, during re-sharpening, may be replaced with a tip portion having a sharpened edge. If off-site re-sharpening is required, only the worn tip portions need to be taken for re-sharpening. Further for example, in some constructions, the bit may be provided with a feed screw which may be relatively larger and/or taller. In any case, in independent aspects, the bit may be a better value product due, in part, to one or more of the convenience of a replaceable tip, the flexibility to switch to carbide tip, an overall lower cost, etc.

Typical users of these tool elements include electricians, plumbers, mechanical contractors, general contractors, metal fabricators, HVAC/sheet metal, MRO, utilities, municipalities, remodelers, service trades, manufacturing/assembly, stick builders, drywallers, cable installers, pest control, automotive aftermarket, woodworkers, DIYers and others. The tool elements may be distributed through electrical, contractor/tool specialty, industrial, plumbing/heating, welding, hardware, rental, home center, catalog, or other channels.

In many industries, these tool elements have a high usage, in remote locations, at all times (of the day, week, year) and in all weather conditions. In other industries and/or with other users, usage of the tool elements may be lower and cost may be a more important factor.

In the utility industries, users are typically drilling through holes in wood power poles and may prefer a spur bit which leaves clean hole for through bolts. An electrician is typically using a tool element to run wire, conduit, Romex, etc., through wood, and a plumber typically uses a tool element to run copper, PVC, ABS pipe, etc., through wood.

With municipalities, these tool elements are used for a wide variety tasks, such as, for example, mass transit, subway track repair, road and/or barrier repairs and installation, street sign installation, etc. Remodelers and landscape maintenance workers may use the tool elements for miscellaneous plumbing and/or electrical installations and repairs such as pre-drilling holes to fasten retaining wall timbers together, etc.

With cable installers, small diameter auger bits are typically used for cable and phone lines. Cost may be extremely important because these users are often subcontractors, are paid by the job, and can be required to provide their own tools. Do-it-yourselfers (DIYers) typically consider overall cost and/or cost of replacement as important factors.

In any case, the tool elements or bits may dull after extended use, the tooth and/or feed screw may damage (e.g., when impacting imbedded objects), and/or the spur, if provided, may dull quickly or be easily damaged. However, in each case, the shaft and auger are not normally damaged during use. Labor costs may be extreme if the tool element fails (inconvenient and expensive to replace the bit, inconvenient to send the bit for re-sharpening, etc.). In independent aspects, the illustrated constructions may provide a tool element with a convenient, easy and/or cost effective way to sharpen the tip portion (by replacement), replace cutting edge/feed screw, etc.

One or more portions of the tool element, the manufacture of the tool element and the operation of the tool element may be similar to that shown and described in U.S. Pat. No. 6,874,978, issued Apr. 5, 2005; the entire contents of which is hereby incorporated by reference.

The embodiments described above and illustrated in the figures are presented by way of example only and are not intended as a limitation upon the concepts and principles of the present invention.

What is claimed is:

1. A tool element for cutting a workpiece, the tool element comprising:
   a body including a shank for connecting the tool element to a power tool;
   one of a projection and a recess formed as part of the body at an end opposite the shank where the projection maximum diameter is less than or equal to the diameter of the shank;
   a first cutting element including a cutting portion and a complimentary one of a projection and a recess adapted to engage the projection or recess of the body to removably connect the cutting element to the body and to inhibit rotation of the cutting element with respect to the body about a long axis of the body; and
   a second cutting element threadably coupled to one of the body and the first cutting element to retain the first cutting element between the second cutting element and the body.

2. The tool element of claim 1, wherein the tool element is a drill bit.

3. The tool element of claim 1, wherein the first cutting element is connected to the body by twisting the cutting element and the body together.

4. The tool element of claim 1, wherein the first cutting element is connected to the body by sliding the first cutting element and the body together.

5. The tool element of claim 1, wherein the body and the first cutting element include complementary structures to inhibit rotation of the cutting element relative to the body.

6. The tool element of claim 5, wherein the projection includes a polygonal shaped portion and the recess includes a polygonal shaped portion, the polygonal shaped projection being received within the polygonal shaped recess to connect the first cutting element to the body and inhibit rotation of the first cutting element relative to the body.

7. The tool element of claim 6, wherein the polygonal shaped portion of the projection is hexagonal and the polygonal shaped portion of the recess is hexagonal.

8. The tool element of claim 1, wherein the first cutting element includes the recess extending therethrough, the second cutting element removably connectable to the body by having a portion of the second cutting element insert into and through the recess in the first cutting element and connecting to the body.

9. The tool element of claim 8, wherein the second cutting element is a feed screw and includes a threaded portion, and the body includes the projection, and wherein the feed screw is removably connectable to the body by inserting and passing the threaded portion of the feed screw through the recess in the first cutting element and threading the threaded portion of the feed screw to the projection.

10. The tool element of claim 1, wherein the body includes external threads and the cutting element includes internal threads complementary to the external threads, the cutting element being removably threaded to the body.

11. The tool element of claim 10, wherein the cutting element is a first cutting element, the tool element including a second cutting element separate from the first cutting element and including internal threads, the first cutting element and the second cutting element being removably threaded to the body.

12. The tool element of claim 11, wherein the external threads of the body include coarse external threads and fine external threads.

13. The tool element of claim 12, wherein the fine external threads are defined in the body adjacent an end of the body and the coarse external threads are defined on the body between the fine external threads and the shank.

14. The tool element of claim 13, wherein the first cutting element threads at least partially past the fine external threads and onto the coarse external threads and the second cutting element threads onto the fine external threads and into contact with the first cutting element.

15. The tool element of claim 1, wherein the cutting element defines an opening therethrough to allow cut debris from the workpiece to pass through the cutting element.

16. The tool element of claim 1, wherein the body is made by a first process and the first cutting element is made by a second process different than the first process.

17. The tool element of claim 1, wherein the first cutting element and the second cutting element are interchangeably connected to the body.

18. The tool element of claim 1, wherein the first cutting element and the second cutting element are simultaneously connected to the body.

19. A tool element for cutting a workpiece, the tool element comprising:
   a body including a shank for connecting the tool element to a power tool;
   a first spiral cutting portion that twists together with the body to connect the first spiral cutting portion and the body to one another;
   one of a projection and a recess formed as part of the body at an end opposite the shank;
   a first cutting element that has a complimentary second spiral cutting portion and a complimentary one of a projection and a recess adapted to engage the projection or recess of the body to removably connect the cutting element to the body and to inhibit rotation of the cutting element with respect to the body about a long axis of the body; and
   a second cutting element threadably coupled to one of the body and the first cutting element to compress the first cutting element between the second cutting element and the body.

20. The tool element of claim 19, wherein the projection maximum diameter is less than or equal to the diameter of the shank.

21. The tool element of claim 19, wherein the second spiral cutting portion substantially aligns with the first spiral cutting portion when the first cutting element is engaged with the body.

* * * * *